United States Patent
Li et al.

(10) Patent No.: US 12,131,244 B2
(45) Date of Patent: Oct. 29, 2024

(54) HARDWARE-OPTIMIZED NEURAL ARCHITECTURE SEARCH

(71) Applicant: Google LLC, Mountain View, CA (US)

(72) Inventors: Sheng Li, Cupertino, CA (US); Norman Paul Jouppi, Palo Alto, CA (US); Quoc V. Le, Sunnyvale, CA (US); Mingxing Tan, Newark, CA (US); Ruoming Pang, New York, NY (US); Liqun Cheng, Foster City, CA (US); Andrew Li, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 729 days.

(21) Appl. No.: 17/039,178

(22) Filed: Sep. 30, 2020

(65) Prior Publication Data

US 2022/0019869 A1 Jan. 20, 2022

Related U.S. Application Data

(60) Provisional application No. 63/052,927, filed on Jul. 16, 2020.

(51) Int. Cl.
  *G06N 3/04* (2023.01)
  *G06N 3/08* (2023.01)
(52) U.S. Cl.
  CPC ............... *G06N 3/04* (2013.01); *G06N 3/08* (2013.01)
(58) Field of Classification Search
  CPC ................................... G06N 3/04; G06N 3/08
  See application file for complete search history.

(56) References Cited

U.S. PATENT DOCUMENTS

| | | | |
|---|---|---|---|
| 2017/0103316 A1* | 4/2017 | Ross | G06N 3/045 |
| 2019/0354837 A1* | 11/2019 | Zhou | G06N 3/044 |
| 2020/0143227 A1 | 5/2020 | Tan et al. | |
| 2020/0210832 A1* | 7/2020 | Driscoll | G06F 18/29 |
| 2020/0356842 A1* | 11/2020 | Guo | G06V 20/20 |
| 2021/0352487 A1* | 11/2021 | Routt | H04W 72/542 |

FOREIGN PATENT DOCUMENTS

| | | |
|---|---|---|
| JP | 2018-195314 | 12/2018 |
| JP | 2019-096285 | 6/2019 |
| JP | 2020-068028 | 4/2020 |

OTHER PUBLICATIONS

PCT International Search Report and Written Opinion in International Application No. PCT/US2021/029619, dated Jul. 23, 2021, 15 pages.
Ridnik et al, "TresNet: High Performance GPU-Dedicated Architecture" arXiv, 2020, 12 pages.
(Continued)

*Primary Examiner* — Li B. Zhen
*Assistant Examiner* — Tirumale K Ramesh
(74) *Attorney, Agent, or Firm* — Fish & Richardson P.C.

(57) ABSTRACT

Methods, systems, and apparatus, including computer programs encoded on computer storage media, for determining an architecture for a task neural network that is configured to perform a particular machine learning task on a target set of hardware resources. When deployed on a target set of hardware, such as a collection of datacenter accelerators, the task neural network may be capable of performing the particular machine learning task with enhanced accuracy and speed.

20 Claims, 5 Drawing Sheets

(56) References Cited

OTHER PUBLICATIONS

International Preliminary Report on Patentability in International Appln. No. PCT/US2021/029619, mailed on Jan. 26, 2023, 9 pages.
Cai et al, "Once for all: Train one network and specialize it for efficient deployment" arXiv, 2019, 11 pages.
Cai et al, "ProxylessNAS: Direct neural architecture search on target task and hardware" ICLR, 2019, 13 pages.
Choquette et al, "Volta: Performance and programmability" IEEE, 2018, 11 pages.
Dally, "Deep learning and HPC" Keynote at NVIDIA Deep Learning Institute, 2017, 74 pages.
Dean, "The deep learning revolution and its implications for computer architecture and chip design" 2019, 17 pages.
Elsken et al, "Efficient multi-objective neural architecture search via lamarckian evolution" arXiv, 2018, 23 pages.
Gholami et al, "Squeezenext: Hardware-aware neural network design" ECV Workshop at CVPR, 2018, 10 pages.
google.com [online], "Cloud TPU" retreived on Aug. 21, 2020, retrieved from: URL <https://cloud.google.com/tpu>, 13 pages.
Gupta et al, "Efficient-edgetpu: Creating accelerator-optimized neural networks with automl" Google AI Blog, 2019, 5 pages.
Han et al, "Learning both Weights and Connections for Efficient Neural Networks" NIPS, 2015, 9 pages.
He et al, "Deep residual learning for image recognition" CVPR, 2016, 9 pages.
He et al, "Acm: Automl for model compression and acceleration on mobile devices" ECCV, 2018, 17 pages.
Howard et al, "Searching for mobilenetv3" ICCV, 2019, 11 pages.
Howard et al, "Mobilenets: Efficient convolutional neural networks for mobile vision applications" arXiv, 2017, 9 pages.
Hsu et al, "MONAS: Multi-objective neural architecture search using reinforcement learning" arXiv, 2018, 8 pages.
Hu et al, "Squeeze-and-excitation networks" CVPR, 2018, 14 pages.
Iandola et al, "SqueezeNet: Alexnet-level accuracy with 50x fewer parameters and <0.5 mb model size" arXiv, 2016, 13 pages.
Jouppi et al, "In-datacenter performance analysis of a tensor processing unit" ISCA, 2017, 12 pages.
Kandasamy et al, "Neural architecture search with bayesian optimisation and optimal transport" arXiv, 2018, 32 pages.
Li et al, "Enabling sparse winograd convolution by native pruning" CoRR, 2017, 8 pages.
Liu et al, "Progressive neural architecture search" ECCV, 2018, 20 pages.
Liu et al, "DARTS: Differentiable architecture search" arXiv, 2018, 12 pages.
Liu et al, "Efficient sparse-winograd convolutional neural networks" ICLR, 2018, 10 pages.
Luo et al, "Neural architecture optimization" arXiv, 2018, 15 pages.
Nvidia, "Nvidia a100 tensor core gpu architecture" White Paper, 2020, 83 pages.
Park et al, "Holistic sparsecnn: Forging the trident of accuracy, speed, and size" ICLR, 2016, 10 pages.
Patterson, Domain Specific Architectures for Deep Neural Networks: Three Generations of Tensor Processing Units (TPUs), Massachusetts Institute of Technology, 2019, 5 pages.
Pham et al, "Efficient neural architecture search via parameter sharing" ICML, 2018, 11 pages.
Radosavovic et al, "Designing network design spaces" CVPR, 2020, 9 pages.
Real et al , "Regularized evolution for image classifier architecture search" AAAI, 2019, 10 pages.
Russakovsky et al, "Imagenet large scale visual recognition challenge" International Journal of Computer Vision, 2015, 43 pages.
Sandler et al, "Mobilenetv2: Inverted residuals and linear bottlenecks" CVPR, 2018, 14 pages.
Szegedy et al, "Rethinking the inception architecture for computer vision" CVPR, 2016, 9 pages.
Szegedy et al, "Inception-v4, inception-resnet and the impact of residual connections on learning" AAAI, 2017, 7 pages.
Tan et al, "Efficientnet: Rethinking model scaling for convolutional neural networks" ICML, 2019, 10 pages.
Tan et al, "MnasNet: Platform-aware neural architecture search for mobile" CVPR, 2019, 9 pages.
Wen et al, "Learning Structured Sparsity in Deep Neural Networks" NIPS, 2016, 9 pages.
Williams et al, Roofline: An Insightful Visual Performance Model for Multicore Architectures Communications of ACM, 2009, 12 pages.
Wu et al, "Fbnet: Hardware-aware efficient convnet design via differentiable neural architecture search" Proceedings of the IEEE Conference on Computer Vision and Pattern Recognition, 2019.
Zhang et al, "Resnest: Split-attention networks" arXiv, 2020, 22 pages.
Zhou et al, "Resource-efficient neural architect" arXiv, 2018, 14 pages.
Zoph et al, "Neural architecture search with reinforcement learning" ICLR, 2017, 16 pages.
Zoph et al, "Learning transferable architectures for scalable image recognition" CVPR, 2018, 14 pages.
Office Action in Japanese Appln. No. 2022-552370, mailed on Jan. 23, 2024, 8 pages (with English translation).
Medium.com [online], "A Basic Introduction to Separable Convolutions," Aug. 14, 2018, retrieved on Jul. 11, 2024, Retrieved from URL<https://towardsdatascience.com/a-basic-introduction-to-separable-convolutions-b99ec3102728>, 9 pages.
Office Action in Japanese Appln. No. 2022-552370, mailed on Jul. 23, 2024, 12 pages (with English translation).

* cited by examiner

```
                                            ┌400

┌─────────────────────────────────────────────────────┐
│ Select, for each of one or more components of a     │
│ candidate neural network architecture, an operation │
│ to be performed by the component from a set of      │
│ operations including a space-to-depth               │
│ convolution operation                               │
│                                                 402 │
└─────────────────────────────────────────────────────┘
                         │
                         ▼
┌─────────────────────────────────────────────────────┐
│ Determine a measure of performance of the selected  │
│ candidate neural network architecture based on its  │
│ (i) performance on the particular machine learning  │
│ task and (ii) performance when deployed             │
│ on a target set of hardware resources               │
│                                                 404 │
└─────────────────────────────────────────────────────┘
```

FIG. 4

HARDWARE-OPTIMIZED NEURAL ARCHITECTURE SEARCH

CROSS-REFERENCE TO RELATED APPLICATIONS

This application claims priority to U.S. Provisional Application No. 63/052,927, filed on Jul. 16, 2020. The disclosure of the prior application is considered part of and is incorporated by reference in the disclosure of this application.

BACKGROUND

This specification relates to modifying neural network architectures.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes how a system implemented as computer programs on one or more computers in one or more locations can determine an architecture for a neural network that is configured to perform a particular neural network task.

Particular embodiments of the subject matter described in this specification can be implemented so as to realize one or more of the following advantages.

Neural Architecture Search (NAS) systems can effectively and automatically, i.e., without user intervention, select a neural network architecture that will result in a high-performing neural network for a particular task. To do so, these systems may employ any of a variety of different search techniques, including search techniques based on reinforcement learning, evolutionary search, differentiable search, and the like. NAS systems can effectively determine novel neural network architectures that are adapted for a particular task, allowing the resulting neural network to have an improved performance on the task. Generally, these systems can effectively explore a large space of possible architectures to identify an architecture for the neural network that is adapted for the particular task.

While these systems are capable of yielding neural network architectures that perform particular tasks with a relatively high degree of accuracy, such architectures are not always capable of performing these tasks at relatively high speeds or otherwise performing the tasks efficiently when deployed on a target set of hardware resources. As such, neural network architectures that are produced by NAS systems, despite being highly accurate, may not always be sufficient for their intended application. In some situations, this may at least in part be due to the designs of such neural network architectures not being optimized for the target set of hardware resources on which they will run.

For instance, in some examples, such a target set of hardware resources may correspond to one or more datacenter accelerators including one or more tensor processing units (TPUs), one or more graphics processing units (GPUs), or a combination thereof. Emerging datacenter accelerators, including TPUs and GPUs, employ innovative hardware architectures to keep up with the ever-increasing demand of computing power from machine learning models, such as neural networks. Such accelerators may be particularly well-suited for machine learning applications because they include matrix-multiply-and-accumulate units or "matrix units" that are configured to perform matrix-multiplication, which can be seen as the core operation in neural networks. Neural network architectures are capable of achieving much higher computation rates (Ops/sec or FLOPs/sec) on such accelerators (e.g., TPUs and GPUs) than they are capable of achieving on some other types of hardware resources, such as central processing units (CPUs). However, in order to achieve peak computation rates on such accelerators, the operational intensity (Ops/Byte) of a neural network architecture must be much higher than it must to be in order to achieve peak computation rates on other types of hardware resources (e.g., CPUs). Such accelerators also require a much higher degree of parallelism from neural network architectures to achieve high execution efficiency than other types of hardware resources (e.g., CPUs) do, as the matrix units of such accelerators will be idle if multiply-and-addition operations in a neural network architecture execute sequentially or there are too few multiply-and-addition operations per cycle. As such, neural network architectures that are capable of performing tasks at relatively high speeds on CPUs may not necessarily be capable of performing the same tasks at relatively high speeds on TPUs or GPUs, and vice versa.

In some implementations, one or more of the NAS systems and techniques described herein may seek to select neural network architectures that are optimized for the target set of hardware resources on which they will run. To do so, the systems and techniques described herein may use a search space augmented with operations that are specific to the target set of hardware resources and multi-objective performance metrics that take both accuracy and latency into account when selecting neural network architectures. For examples in which the target set of hardware resources corresponds to one or more datacenter accelerators, including one or more TPUs and/or GPUs, the search space that is utilized by one or more of the NAS systems and techniques described herein may include one or more "accelerator-friendly" operations that may provide for neural network architectures with enhanced operational intensity, parallelism, and/or execution efficiency. For example, because depthwise convolutions suffer from lower operational intensity, in some implementations, the search space that is utilized by one or more of the NAS systems and techniques described herein may include one or more operations to fuse depthwise convolutions with adjacent 1×1 convolutions to improve operational intensity. Furthermore, because larger input and output depths may provide for higher degrees of parallelism in datacenter accelerators (e.g., TPUs and/or GPUs), in some implementations, the search space that is utilized by one or more of the NAS systems and techniques described herein may include one or more operations that use convolutions with n×n kernels, where n represents an integer value that is greater than one (e.g., n=2), to reshape input tensors to improve parallelism. In some examples, one or more of these operations use stride-n n×n convolutions, such as stride-2 2×2 convolutions. Such convolution operations can also serve to benefit the capacity and accuracy of neural network architectures. In addition, in some implementations, the search space that is utilized by one or more of the NAS systems and techniques described herein may include activation functions that provide for enhanced parallelism in datacenter accelerators (e.g., TPUs and/or GPUs).

While there is a general belief that the total number of computations (FLOPS) required in a neural network architecture is proportional to the neural network architecture's speed, and thus that fewer computations lead to faster neural network architectures, in developing the NAS systems and techniques described herein, the opposite has been found to be true when neural network architectures run on datacenter accelerators (e.g., TPUs and/or GPUs). As such, the total number of computations (FLOPS) required in a neural network architecture, alone, may not paint a full or accurate picture of the neural network architecture's performance when deployed on such accelerators. For at least this reason, actual measures of each candidate neural network architecture's speed when deployed on the target set of hardware resources may be factored into multi-objective performance metrics that are determined and utilized in one or more of the systems and techniques described herein. For instance, in some implementations, the systems and techniques described herein may operate to obtain measures of the accuracy with which candidate neural network architectures perform tasks, run candidate neural network architectures on the target set of hardware resources (e.g., one or more TPUs and/or GPUs) to obtain actual measures of the speed (e.g., latency) with which candidate neural networks perform tasks when deployed on the target set of hardware resources and/or the performance of such tasks (e.g., operational intensity, execution efficiency, etc.), and select final neural network architectures based at least in part on such measures. In this way, the systems and techniques described herein may provide for the selection of final neural network architectures that are configured to perform tasks with relatively high levels of accuracy and at relatively high speeds. Not only may this benefit the end users of such neural network architectures, but it may also provide significant cost savings for the owners and/or operators of the target sets of hardware resources on which these neural network architectures run.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flow diagram of an example process representative of an iteration of a process for performing a search through a space of candidate neural network architectures to identify one or more candidate neural network architectures.

Like reference numbers and designations in the various drawings indicate like elements.

DETAILED DESCRIPTION

Figure 1:
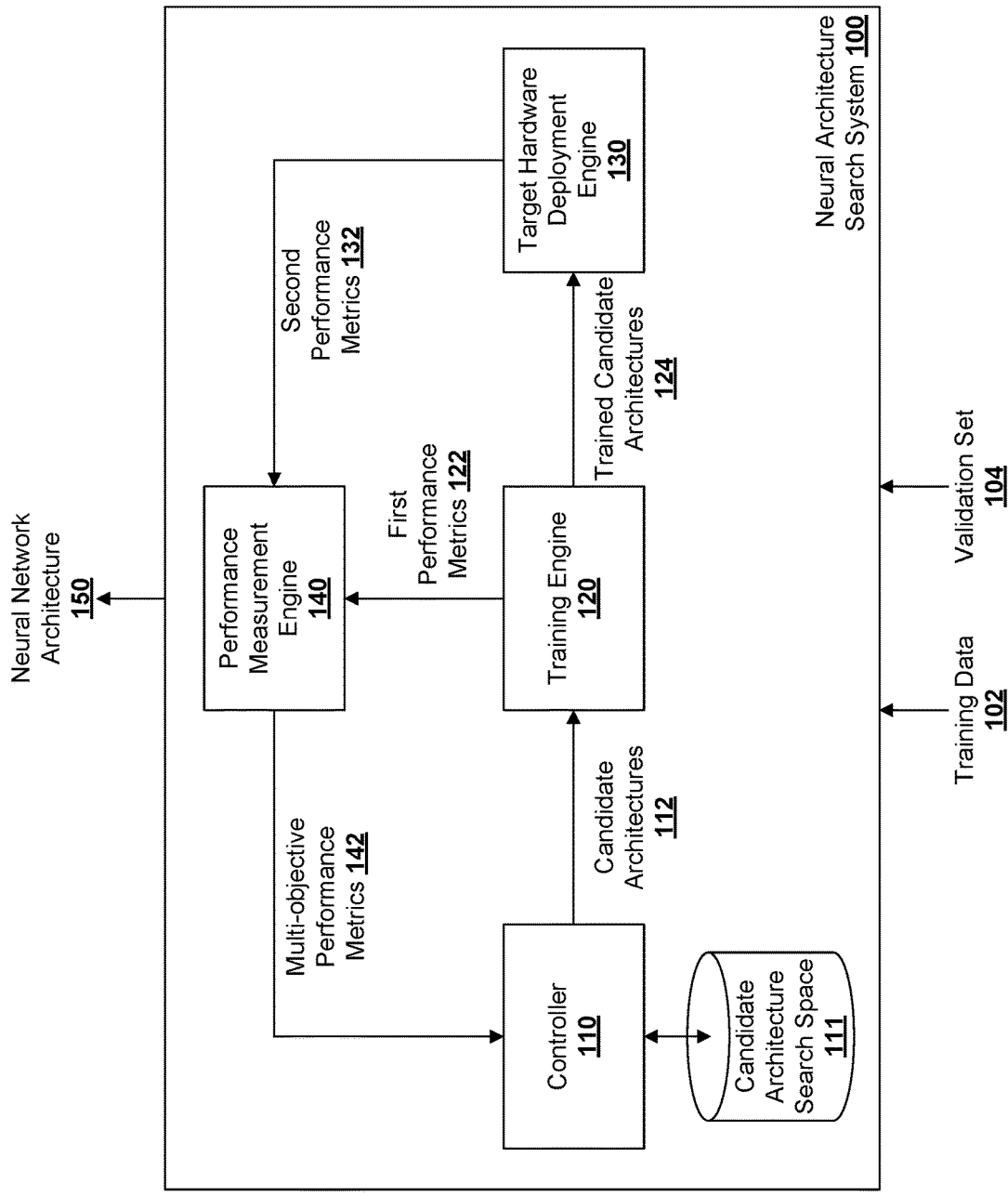
FIG. 1 shows an example neural architecture search system.

This specification describes a system implemented as computer programs on one or more computers in one or more locations that determines an architecture for a task neural network that is configured to perform a particular machine learning task on a target set of hardware resources.

The task neural network can be configured to receive any kind of digital data input and to generate any kind of score, classification, or regression output based on the input. In other words, the particular machine learning task that the task neural network is configured to perform may correspond to any of a variety of different tasks including scoring, classification, and/or regression tasks. As described below, such tasks may be useful in a wide range of applications, such as those involving the processing of images, text, speech, and other data.

For example, if the inputs to the task neural network are images or features that have been extracted from images, the output generated by the task neural network for a given image may be scores for each of a set of object categories, with each score representing an estimated likelihood that the image contains an image of an object belonging to the category.

As another example, if the inputs to the task neural network are Internet resources (e.g., web pages), documents, or portions of documents or features extracted from Internet resources, documents, or portions of documents, the output generated by the task neural network for a given Internet resource, document, or portion of a document may be a score for each of a set of topics, with each score representing an estimated likelihood that the Internet resource, document, or document portion is about the topic.

As another example, if the inputs to the task neural network are features of an impression context for a particular advertisement, the output generated by the task neural network may be a score that represents an estimated likelihood that the particular advertisement will be clicked on.

As another example, if the inputs to the task neural network are features of a personalized recommendation for a user, e.g., features characterizing the context for the recommendation, e.g., features characterizing previous actions taken by the user, the output generated by the task neural network may be a score for each of a set of content items, with each score representing an estimated likelihood that the user will respond favorably to being recommended the content item.

As another example, if the input to the task neural network is a sequence of text in one language, the output generated by the task neural network may be a score for each of a set of pieces of text in another language, with each score representing an estimated likelihood that the piece of text in the other language is a proper translation of the input text into the other language.

As another example, if the input to the task neural network is a sequence representing a spoken utterance, the output generated by the task neural network may be a score for each of a set of pieces of text, each score representing an estimated likelihood that the piece of text is the correct transcript for the utterance.

In some examples, the system that determines the architecture for the task neural network may correspond to system 100, as described in further detail below with reference to FIG. 1. Similarly, in some examples, the architecture of the task neural network may correspond to one or both of neural network architectures 150 and 200, as described in further detail below with reference to FIGS. 1 and 2, respectively.

FIG. 1 shows an example neural architecture search (NAS) system 100. The neural architecture search system 100 is an example of a system implemented as computer programs on one or more computers in one or more locations, in which the systems, components, and techniques described below can be implemented.

The neural architecture search system 100 is a system that determines an architecture for a task neural network that is configured to perform a particular machine learning task on a target set of hardware resources. The architecture defines the number of layers in the neural network, the operations performed by each of the layers, and the connectivity between the layers in the neural network, i.e., which layers receive inputs from which other layers in the neural network. As mentioned above, the task neural network can be configured to receive digital data input and to perform a particular machine learning task (e.g., scoring, classification, regression, etc.) to generate an output based on the input. The architecture that is determined by the system 100 defines the number of layers in the neural network, the operations performed by each of the layers, and the connectivity between the layers in the neural network, i.e., which layers receive inputs from which other layers in the neural network.

The neural architecture search system 100 includes a controller 110, a training engine 120, a target hardware deployment engine 130, and a performance measurement engine 140. Briefly, and as described in further detail below, the controller 110 repeatedly selects candidate neural network architectures from a candidate architecture search space 111 based on performance measures of previously-selected candidate neural network architectures (e.g., multi-objective performance metrics 142). The training engine 120 uses training data 102 and validation set 104 to train each candidate neural network architecture selected by the controller 110 to perform a particular machine learning task, and determines a first performance metric 122 for each trained candidate neural network architecture based on the performance of the respective trained candidate neural network architecture on the particular machine learning task. The target hardware deployment engine 130 runs each trained candidate neural network architecture on a target set of hardware resources (e.g., a collection hardware accelerators in a data center), and determines a second performance metric 132 for each trained candidate neural network architecture based on the performance of the respective trained candidate neural network architecture when deployed on the target set of hardware resources. The performance measurement engine 140 determines a multi-objective performance metric 142 for each trained candidate neural network architecture based on the first performance metric 122 and the second performance metric 132 determined for the respective trained candidate neural network architecture. In some examples, the performance measurement engine 140 further provides the multi-objective performance metric 142 determined for each trained candidate neural network architecture to the controller 110, which in turn selects one or more additional candidate neural network architectures from the candidate architecture search space 111 based at least in part on said multi-objective performance metric 142.

As an example, the controller 110 may select the $k^{th}$ candidate neural network architecture from the candidate architecture search space 111 based at least in part on the multi-objective performance metric 142 determined for the $(k-1)^{th}$ candidate neural network architecture selected by the controller 110, the multi-objective performance metric 142 determined for the $(k-2)^{th}$ candidate neural network architecture selected by the controller 110, and so on. In this example, the training engine 120 may then use training data 102 and validation set 104 to train an instance of the $k^{th}$ candidate neural network architecture selected by the controller 110 to perform a particular machine learning task, and determine a first performance metric 122 for the trained instance of $k^{th}$ candidate neural network architecture based on its performance of the particular machine learning task. Furthermore, in this example, the target hardware deployment engine 130 may run the trained instance of $k^{th}$ candidate neural network architecture on a target set of hardware resources (e.g., a collection hardware accelerators in a data center), and determine a second performance metric 132 for the trained instance of $k^{th}$ candidate neural network architecture based on its performance when deployed on the target set of hardware resources. The performance measurement engine 140 may then, in this example, determine a multi-objective performance metric 142 for the $k^{th}$ candidate neural network architecture selected by the controller 110 based on the first performance metric 122 and the second performance metric 132 determined by the training engine 120 and the target hardware deployment engine 130 for the trained instance of $k^{th}$ candidate neural network architecture. In this example, the performance measurement engine 140 may provide the multi-objective performance metric 142 determined for the $k^{th}$ candidate neural network architecture selected by the controller 110, which in turn may then select the $(k+1)^{th}$ candidate neural network architecture from the candidate architecture search space 111 based at least in part on the multi-objective performance metric 142 determined for the $k^{th}$ candidate neural network architecture selected by the controller 110, the multi-objective performance metric 142 determined for the $(k-1)^{th}$ candidate neural network architecture selected by the controller 110, the multi-objective performance metric 142 determined for the $(k-2)^{th}$ candidate neural network architecture selected by the controller 110, and so on.

Generally, the training data 102 and the validation set 104 both include a set of neural network inputs and, for each network input, a respective target output that should be generated by the neural network to perform the particular task. For example, a larger set of training data may have been randomly partitioned to generate the training data 102 and the validation set 104.

The system 100 can receive the training data 102 and the validation set 104 in any of a variety of ways. For example, the system 100 can receive training data as an upload from a remote user of the system over a data communication network, e.g., using an application programming interface (API) made available by the system 100, and randomly divide the uploaded data into the training data 102 and the validation set 104. As another example, the system 100 can receive an input from a user specifying which data that is already maintained by the system 100 should be used for training the neural network, and then divide the specified data into the training data 102 and the validation set 104.

The controller 110 is configured to select candidate neural network architectures from a candidate architecture search space 111, and generate output 112 defining the selected candidate neural network architectures. The candidate architecture search space 111 may include a set or list of operations that may performed by components of candidate neural network architectures. The operations reflected in the candidate architecture search space 111 may be seen as the building blocks from which system 100 may construct, design, or otherwise develop candidate neural network architectures. In some examples, to select each candidate neural network architecture from the candidate architecture search space 111, the controller 110 is configured to select, for each of one or more components of each candidate neural network architecture, an operation to be performed by the component from the set or list of operations reflected in the candidate architecture search space 111.

In some implementations, the set or list of operations reflected in the candidate architecture search space 111 may include operations that are specific to the target set of hardware resources on which the candidate neural network architectures are intended to run or otherwise serve to take advantage of certain attributes of the target set of hardware resources. As such, for examples in which the target set of hardware resources corresponds to one or more TPUs and/or GPUs, the set or list of operations reflected in the candidate architecture search space 111 may include operations that promote improved operational intensity, parallelism, and/or execution efficiency. In this way, the candidate neural network architectures that are selected by the controller 110 using the candidate architecture search space 111 may be more likely to be capable of performing the particular task at relatively high speeds when deployed on the target set of hardware resources. In particular, for examples in which the target set of hardware resources corresponds to one or more TPUs and/or GPUs, the set or list of operations reflected in the candidate architecture search space 111 may include one or more operations to fuse depthwise convolutions with adjacent 1×1 convolutions, one or more space-to-depth convolution operations (e.g., 2×2 convolutions) that reshape input tensors by increasing a depth of the input tensor while decreasing a spatial extent of the input tensor, or a combination thereof. In some implementations, the one or more space-to-depth operations that are included in the set or list of operations reflected in the candidate architecture search space 111 may include one or more operations that use stride-n n×n convolutions (e.g., operations that use convolutions with n×n kernels), where n represents an integer value that is greater than one (e.g., 2 or 4), and may serve to reshape a H×W×C tensor input to a $$\frac{H}{n} \times \frac{W}{n} \times n^2 C$$

tensor. In some examples, the set or list of operations reflected in the candidate architecture search space 111 may further include one or more additional operations including one or more other types of convolution operations and/or one or more reshape operations that each modify a shape of the input tensor by performing one or more memory operations in one or more memories of the target set of hardware resources. For instance, the candidate architecture search space 111 search space can include an operation (e.g., a space-to-batch operation) that reshapes the input tensor by moving elements of the tensor to different memory locations in the memory, copying elements from one memory location to another, or both. As a particular example, the operation can be one that rearranges blocks of spatial data into depth. More specifically, this operation outputs a copy of the input tensor where values from the height and width dimensions are moved to the depth dimension. In some implementations, this operation corresponds to a space-to-batch operation.

In some examples, the controller 110 is configured to generate output 112 in accordance with parameters that govern the operation of controller 110 (referred to herein as "controller parameters"). In some implementations, the controller 110 is configured to select at least some candidate neural network architectures from the candidate architecture search space 111 based at least in part on multi-objective performance metrics 142, as described in further detail below with reference to the performance measurement engine 140 of system 100, and/or other feedback produced within system 100. In at least some of the aforementioned implementations, one or more of the controller parameters of controller 110 may be adjusted or tuned based at least in part on multi-objective performance metrics 142 and/or other feedback produced within system 100. The controller 110 may select candidate neural network architectures and/or generate output 112 specifying such candidate neural network architectures using any of a variety of different NAS techniques, such as NAS techniques based on reinforcement learning, evolutionary search, differentiable search, and the like. In some examples, the controller 110 represents or includes a neural network, such as a recurrent neural network (RNN), that that is configured to generate output sequences in accordance with the controller parameters. Generally, in these examples, the system 100 determines the architecture for the neural network by training the controller 110 to adjust the values of the controller parameters.

For each candidate neural network architecture selected by the controller 110 and represented in output 112 generated by the controller 110, the training engine 120 trains an instance of the neural network that has the architecture defined by the output 112 on the training data 102 and evaluates the performance (e.g., accuracy) of the trained instance on the validation set 104. In some implementations, to evaluate the performance of the trained instance of the neural network that has the architecture defined by the output 112, the training engine 120 determines a first performance metric 122 or measure of performance of the trained instance on the particular machine learning task. In some examples, the first performance metric 122 determined for a given candidate neural network architecture may be indicative of a level of accuracy with which the candidate neural network architecture may be capable of performing the particular machine learning task.

The training engine 120 may provide first performance metrics 122 determined for candidate neural network architectures selected by the controller 110 to the performance measurement engine 140 for further evaluation. In addition, the training engine 120 may also provide trained instances 124 of the candidate neural network architectures selected by the controller 110 to the target hardware deployment engine 130.

The target hardware deployment engine 130 performs one or more operations to determine a second performance metric 132 or measure of performance of each trained instance of each neural network architecture selected by the controller 110 (and defined by the output 112) when deployed on the target set of hardware resources. In some examples, the second performance metric 132 determined for a given candidate neural network architecture may be indicative of a level of speed or latency with which the candidate neural network architecture may be capable of performing the particular machine learning task when deployed on the target set of hardware resources. To determine the second performance metric 132 for a given candidate neural network architecture, the target hardware deployment engine 130 may perform one or more operations to run the candidate neural network architecture on the target set of hardware resources.

As mentioned above, in some implementations, the target set of hardware resources may correspond to one or more TPUs and/or GPUs. In some of examples, the target set of hardware resources may correspond to a collection of hardware accelerators in a data center, which may include one or more TPUs, GPUs, other types of matrix machines and/or vector machines, or a combination thereof. Although described primarily with reference to one or more TPUs and/or GPUs, it is to be understood that, in some examples, the target set of hardware resources may correspond to one or more CPUs, edge or mobile computing devices, or other computing units. In such examples, the set or list of operations reflected in the candidate architecture search space 111 may include operations that are specific to the target set of hardware resources or otherwise serve to take advantage of certain attributes of the target set of hardware resources. In some implementations, the target set of hardware resources may correspond to a combination of two or more of the aforementioned types of hardware resources (e.g., TPUs, GPUs, CPUs, edge or mobile computing devices, etc.).

In some examples, the target set of hardware resources may be included as part of system 100, but reserved for performing operations associated with the target hardware deployment engine 130. In other examples, the target set of hardware resources may be communicatively coupled to the target hardware deployment engine 130 and/or one or more other components of system 100. In either case, the target hardware deployment engine 130 is configured to deploy trained instances of the candidate neural network architectures selected by the controller 110 on the target set of hardware resources and determine second performance metrics 132 on the basis thereof.

More specifically, upon deploying a trained instance of a given candidate neural network on the target set of hardware resources, the target hardware deployment engine 130 may measure or determine (i) a latency of generating an output using the candidate neural network when deployed on the target set of hardware resources, (ii) an operational intensity of the candidate neural network when deployed on the target set of hardware resources, and/or (iii) an execution efficiency of the candidate neural network when deployed on the target set of hardware resources. In some implementations, the second performance metric 132 is based at least in part on one or more of aforementioned parameters (i), (ii), and (iii). In some implementations, the target hardware deployment engine 130 may determine the second performance metric 132 for the candidate neural network architecture based at least in part on one or more of aforementioned parameters (i), (ii), and (iii). In at least some of these implementations, the target hardware deployment engine 130 may use one or more of aforementioned parameters (i), (ii), and (iii) as the second performance metric 132 for the candidate neural network. In some examples, each of aforementioned parameters (i), (ii), and (iii) is directly or indirectly reflected in the second performance metric 132. Other configurations are possible.

In some implementations, the target set of hardware resources may be included as part of system 100 and leveraged for performing operations associated with one or more components of system 100 in addition to the target hardware deployment engine 130. In some such implementations, some or all of the functionality of the target hardware deployment engine 130 may be integrated into the training engine 120, or vice versa. For instance, in some such implementations, the system 100 may determine first performance metrics 122 and second performance metrics 132 in a contemporaneous or nearly contemporaneous manner. Furthermore, in some examples, the target hardware deployment engine 130 may not necessarily deploy trained instances of the candidate neural network architectures selected by the controller 110 on the target set of hardware resources to determine the second performance metric 132 for the candidate neural network architecture, but instead may perform one or more operations to approximate or predict the second performance metric 132. For instance, in some such examples, the target hardware deployment engine 130 may leverage known or predetermined parameters of a target set of hardware resources in conjunction with one or more models to calculate the second performance metric 132 or simulate a performance of a given candidate neural network when deployed on the target set of hardware resources and obtain one or more measures thereof. Other configurations are possible.

In Some Implementations, Latency, Operational Intensity, and Execution Efficiency, as Described Herein, May be Defined as:

$$\text{LATENCY} = \frac{W}{C} = \frac{W}{C_{Ideal} \times E}, \quad C_{Ideal} = \begin{cases} I \times b, & I < R \\ C_{Max}, & \text{else} \end{cases}, \quad I = \frac{W}{Q},$$

where W (in FLOPs) is the amount of computation required in a neural network architecture, Q (in Bytes) is the memory traffic (bytes of memory transfers) incurred during execution of the neural network architecture, I is the operational intensity of the neural network architecture, C (in FLOPs/sec) is the computation rate achieved by the neural network architecture, $C_{Ideal}$ is the ideal computation rate achieved by the neural network architecture, E is the execution efficiency of the neural network, b is the memory bandwidth of the target set of hardware resources, $C_{Max}$ is the peak computation rate achievable on the target set of hardware resources, and R is the "ridge point" or the minimum operational intensity required of the neural network architecture to achieve the peak computation rate on the target set of hardware resources. As demonstrated in the equations above, C is determined by $C_{Ideal}$ and E (e.g., E is defined as $C/C_{Ideal}$), and $C_{Ideal}$ is determined by I, b, $C_{Max}$, and R. Parameters b, $C_{Max}$, and R may be constant values associated with the target set of hardware resources. Indeed, the end-to-end inference latency of a neural network architecture is a function of W, I, and E. As such, to optimize latency on datacenter accelerators (e.g., TPUs, GPUs, etc.), the system 100 may strive to holistically and simultaneously optimize W, I, and E, instead of only attempting to reduce W (FLOPs). The system 100 may be configured to operate in this manner because reducing W (FLOPs) without considering I and E can cause C to drop much more rapidly than W, which can cause a degradation in latency.

Much like the training engine 120, the target hardware deployment engine 130 may provide second performance metrics 132 determined for candidate neural network architectures selected by the controller 110 to the performance measurement engine 140 for further evaluation. The performance measurement engine 140 then uses the first performance metrics 122 and the second performance metrics 132 to determine multi-objective performance metrics 142. The multi-objective performance metric 142 that is determined by the performance measurement engine 140 for a given candidate neural network architecture may combine the first performance metric 122 determined by the training engine 120 for the candidate neural network architecture with the second performance metric 132 determined by the target hardware deployment engine 130 for the candidate neural network architecture. As an example, for some implementations in which the first performance metric 122 is indicative of a level of accuracy with which a given candidate neural network architecture may be capable of performing the particular machine learning task and the second performance metric 132 is indicative of a latency of performing the particular machine learning task by the candidate neural network architecture when deployed on the target set of hardware resources, the multi-objective performance metric 142 that is determined for the $m^{th}$ candidate neural network architecture selected by the controller 110 may combine accuracy and latency as:

$$\text{ACCURACY}(m) \times \left[\frac{\text{LATENCY}_{Actual}(m)}{\text{LATENCY}_{Target}(m)}\right]^{\omega},$$

where ACCURACY(m) is the measured level of accuracy with which the $m^{th}$ candidate neural network architecture may be capable of performing the particular machine learning task as indicated by the first performance metric 122 determined by the training engine 120 for the $m^{th}$ candidate neural network architecture, $\text{LATENCY}_{Actual}(m)$ is the measured latency of performing the particular machine learning task by the $m^{th}$ candidate neural network architecture when deployed on the target set of hardware resources as indicated by the second performance metric 132 determined by the target hardware deployment engine 130 for the $m^{th}$ candidate neural network architecture, $\text{LATENCY}_{Target}(m)$ is the target or ideal latency of performing the particular machine learning task by the $m^{th}$ candidate neural network architecture when deployed on the target set of hardware resources as determined based on known or approximated attributes of the target set of hardware resources, input provided by the user who is searching for the neural network architecture (e.g., a target latency specified by the user), and/or current operating conditions, and $\omega$ is a factor that is used to decide the weight that latency performance is given in the multi-objective performance metric 142. In some examples, the value of $\omega$ may be adjustable. For instance, in some of these examples, the value of $\omega$ may be determined based on input provided by the user who is searching for the neural network architecture.

Similarly, for some implementations in which the first and second performance metrics 122, 132 are indicative of accuracy and latency, respectively, in much the same way they are in the aforementioned example, and the second performance metric 132 is further indicative of an operational intensity of a given candidate neural network architecture when deployed on the target set of hardware resources and an execution efficiency of the candidate neural network architecture when deployed on the target set of hardware resources, the multi-objective performance metric 142 that is determined for the $m^{th}$ candidate neural network architecture selected by the controller 110 may combine accuracy, latency, operational intensity, and execution efficiency as:

$$\text{ACCURACY}(m) \times \left[\frac{\text{LATENCY}_{Actual}(m)}{\text{LATENCY}_{Target}(m)}\right]^{\omega} \times \left[\frac{I_{Actual}(m)}{I_{Target}(m)}\right]^{\theta} \times \left[\frac{E_{Actual}(m)}{E_{Target}(m)}\right]^{\gamma},$$

where $I_{Actual}(m)$ is the measured operational intensity of the $m^{th}$ candidate neural network architecture when deployed on the target set of hardware resources as indicated by the second performance metric 132 determined by the target hardware deployment engine 130 for the $m^{th}$ candidate neural network architecture, $I_{Target}(m)$ is the target or ideal operational intensity of the $m^{th}$ candidate neural network architecture when deployed on the target set of hardware resources as determined based on known or approximated attributes of the target set of hardware resources, input provided by the user who is searching for the neural network architecture (e.g., a target operational intensity specified by the user), and/or current operating conditions, $\theta$ is a factor that is used to decide the weight that operational intensity is given in the multi-objective performance metric 142, $E_{Actual}(m)$ is the measured execution efficiency of the $m^{th}$ candidate neural network architecture when deployed on the target set of hardware resources as indicated by the second performance metric 132 determined by the target hardware deployment engine 130 for the $m^{th}$ candidate neural network architecture, $E_{Target}(m)$ is the target or ideal execution efficiency of the $m^{th}$ candidate neural network architecture when deployed on the target set of hardware resources as determined based on known or approximated attributes of the target set of hardware resources, input provided by the user who is searching for the neural network architecture (e.g., a target operational intensity specified by the user), and/or current operating conditions, and $\gamma$ is a factor that is used to decide the weight that execution efficiency is given in the multi-objective performance metric 142. Much like the value of $\omega$, in some examples, one or both of the value of $\theta$ and the value of $\gamma$ may be adjustable. For instance, in some of these examples, one or both of the value of $\theta$ and the value of $\gamma$ may be determined based on input provided by the user who is searching for the neural network architecture. It is to be understood that terms may be inserted or removed from the equation above as needed depending on the parameters indicated or not indicated by the second performance metric 132. For example, the equation that governs the multi-objective performance metric 142 may omit latency and operational intensity terms in situations where the second performance metric 132 is determined based on execution efficiency (but not also latency and operational intensity). Other configurations are possible.

As mentioned above, in some implementations, multi-objective performance metrics 142 may be provided to the controller 110 and, in some such implementations, may be leveraged by the controller 110 to select additional candidate neural network architectures. In some examples, the system 100 uses multi-objective performance metrics 142 to update the current values of the controller parameters to improve the expected performance of the architectures defined by the outputs 112 generated by the controller 110 on the task. For instance, the system 100 may update the controller parameters in a manner so as to maximize the value of the multi-objective metric 142 (e.g., using Proximal Policy Optimization). For implementations in which the controller 110 includes a neural network, multi-objective performance metrics 142 may effectively serve as a "reward" that is used to train the neural network of the controller 110. By repeatedly updating the values of the controller parameters in this manner, the system 100 can train or otherwise cause the controller 110 to ultimately generate outputs 112 that result in neural networks that have increased performance on the particular task, i.e., to maximize the expected accuracy on the validation set 104 of the architectures proposed by the controller 110, as well as increased performance when deployed on the target set of hardware resources, i.e., to maximize the speed at which the particular task is expected to be performed.

Once the controller 110 has been trained (e.g., the controller parameters have converged), has exhausted the candidate architecture search space 111, has produced a maximum number of candidate neural network architectures, has produced one or more candidate neural network architectures with multi-objective performance metrics 142 that satisfy one or more sets of criteria (e.g., one or more threshold values), and/or some other termination criteria have been satisfied, the system 100 can select a final architecture for the neural network. To select the final architecture, the system 100 can generate a new output 112 in accordance with the trained values of the controller parameters and use the architecture defined by the new output 112 as the final architecture of the neural network, or can generate multiple new outputs 112 in accordance with the trained values and then select one of the multiple candidate neural network architectures defined by the multiple new outputs 112. In some examples, to select one or more final architecture, the system 100 may select the one or more candidate neural network architectures that yielded the greatest first performance metric 122, second performance metric 132, and/or multi-objective performance metric 142. In implementations where multiple new outputs 112 are generated, the system 100 can evaluate the performance of the architecture defined by each new output 112 on the validation set 104 and then select the highest-performing architecture (e.g., the candidate neural network architecture yielding a multi-objective performance metric 142 greater in value than that of all other candidate neural network architectures considered by the system 100) as the final architecture. Alternatively, the system 100 can further train each selected architecture and then evaluate the performance of each of the architectures after the further training.

The neural network search system 100 can then output architecture data 150 that specifies the final architecture of the neural network, i.e., data specifying the layers that are part of the neural network, the connectivity between the layers, and the operations performed by the layers. For example, the neural network search system 100 can output the architecture data 150 to the user that submitted the training data. In some cases, the data 150 also includes trained values of the parameters of the neural network from the training of the trained instance of the neural network that had the architecture.

In some implementations, instead of or in addition to outputting the architecture data 150, the system 100 trains an instance of the neural network having the determined architecture, e.g., either from scratch or to fine-tune the parameter values generated as a result of training the instance of the neural network having the architecture, and then uses the trained neural network to process requests received by users, e.g., through the API provided by the system. That is, the system 100 can receive inputs to be processed, use the trained neural network to process the inputs, and provide the outputs generated by the trained neural network or data derived from the generated outputs in response to the received inputs. In some examples, the system 100 may select the final architecture using one or more of the techniques described above, and then scales up the size of the architecture using a model scaling technique to generate the final architecture that is specified in data 150. In other examples, one or more systems may receive data 150 from the system 100 and scale up the size of the architecture specified in data 150 using such a model scaling technique.

For some implementations in which the controller 110 includes a neural network, such as an RNN, the system 100 may train the neural network of the controller 110 in a distributed manner. That is, the system 100 includes multiple replicas of the neural network of the controller 110. In some of these implementations where the training is distributed, each replica has a dedicated training engine that generates performance metrics for batches of outputs 112 output by the replica and a dedicated controller parameter update engine that determines updates to the controller parameters using the performance metrics. Once the controller parameter update engine has determined an update, the controller parameter update engine can transmit the update to a central parameter updating server that is accessible to all of the controller parameter updates engines. The central parameter updating server can update the values of the controller parameters that are maintained by the server and send the updated values to the controller parameter update engine. In some cases, each of the multiple replicas and their corresponding training engines and parameter updating engines can operate asynchronously from each other set of training engines and parameter updating engines.

In some examples, the final architecture that is selected for the neural network by the system 100 and specified by the architecture data 150 that is output by neural network search system 100 may be similar or equivalent to that of neural network architecture 200, as described in further detail below with reference to FIG. 2. Such a final architecture for the neural network may be particularly well-suited for deployment on one or more TPUs and/or GPUs.

Figure 2:
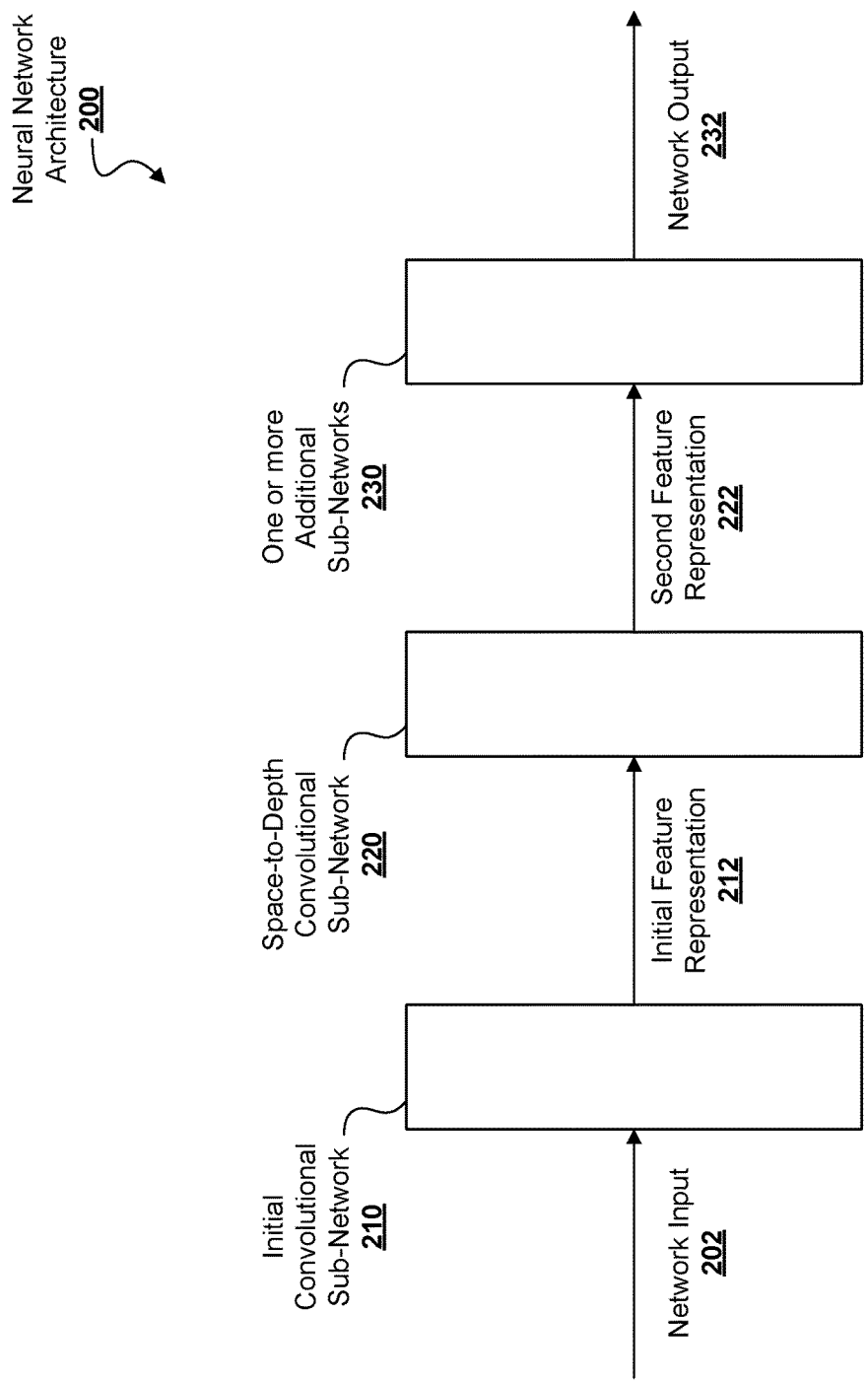
FIG. 2 is a diagram of an example neural network architecture.

FIG. 2 illustrates an example neural network architecture 200. More specifically, the neural network architecture 200 includes an initial convolutional sub-network 210, a space-to-depth convolutional sub-network 220, and one or more additional sub-networks 230. As mentioned above, in some examples, the neural network architecture 200 may correspond to a final neural network architecture that is selected by the system 100, as described above with reference to FIG. 1.

The neural network architecture 200 is designed for optimized performance when deployed on one or more TPUs, one or more GPUs, and/or one or more other matrix or vector machines. As such, the system 100 may be more likely to select a final neural network architecture that is similar or equivalent to the neural network architecture 200 in situations where the target set of hardware resources associated with the system 100 include one or more TPUs and/or GPUs. Given that the neural network architecture 200 may correspond to a final neural network architecture that is selected by the system 100, it follows that components of the neural network architecture 200 may be configured to perform operations from the set or list of operations reflected in the candidate architecture search space 111, as described above with reference to FIG. 1. Briefly, and as described in further detail below, the neural network architecture 200 is configured to receive and process a network input 202 to generate a network output 232 for the network input 202 for a particular machine learning task. For example, the particular machine learning task that the neural network architecture 200 is configured to perform may be an image processing task. In this example, the network input 202 may correspond to data representing one or more images.

The initial convolutional sub-network 210 of the neural network architecture 200 may include one or more convolutional layers configured to receive the network input 202 and generate an initial feature representation 212 of the network input 202. The initial feature representation 212 of the network input 202 that is generated by the initial convolutional sub-network 210 has a first spatial extent and a first number of depth channels. The initial convolutional sub-network 210 may be configured to output the initial feature representation 212 of the network input 202 to the space-to-depth convolutional sub-network 220.

The space-to-depth convolutional sub-network 220 of the neural network architecture 200 may include one or more convolutional layers configured to receive the initial feature representation 212 from the initial convolutional sub-network 210 and perform a space-to-depth convolutional operation on the initial feature representation 212 to generate a second feature representation 222 of the network input 202. The second feature representation 222 of the network input 202 that is generated by the space-to-depth convolutional sub-network 220 has a second spatial extent that is smaller than the first spatial extent and a second number of depth channels that is larger than the first number of depth channels. In other words, the space-to-depth convolutional operation that the space-to-depth convolutional sub-network 220 performs is one that increases a depth of an input tensor while decreasing a spatial extent of the input tensor. By reshaping input tensors of convolutions in this manner, this operation may serve to improve parallelism in accelerators (e.g., TPUs and/or GPUs). In addition, this operation may also serve to benefit the capacity and accuracy of neural network architectures. Such an operation may represent an operation (e.g., an "accelerator-friendly" operation) from the set or list of operations reflected in the candidate architecture search space 111, as described above with reference to FIG. 1.

In some implementations, the space-to-depth convolutional operation that the space-to-depth convolutional sub-network 220 performs is a stride-n n×n convolution (e.g., a convolution with n×n kernels), where n represents an integer value that is greater than one, such as 2 or 4. Such an operation may serve to reshape a H×W×C tensor input to a $$\frac{H}{n} \times \frac{W}{n} \times n^2 C$$

tensor. Importantly, this operation increases depth without changing the total tensor volume, such that overall speed may be improved without compromising accuracy. Although input tensors can be reshaped in a similar manner using a space-to-batch operation or other reshape operation that modifies the shape of an input tensor by performing one or more memory operations, the space-to-depth convolutional operation that the space-to-depth convolutional sub-network 220 performs has two advantages: (i) convolution is associated with a relatively high operational intensity and execution efficiency, and thus translates favorably to deployment on TPUs and/or GPUs, and (ii) in addition to reshaping the input tensor to improve operational intensity and execution efficiency, the stride-n n×n convolution can also be trained to contribute to the capacity of the corresponding neural network. This operation can be trained to mimic the behavior of a space-to-batch operation or other reshape operation that modifies the shape of an input tensor by performing one or more memory operations, and can be further trained to improve the accuracy of the neural network architecture while improving the speed of the neural network architecture by increasing parallelism.

The space-to-depth convolutional sub-network 220 may be configured to output the second feature representation 222 of the network input 202 to one or more additional sub-networks 230 of the neural network architecture 200. The one or more sub-networks 230 of the neural network architecture 200 may include one or more layers (e.g., convolutional layers) configured to receive the second feature representation 222 from the space-to-depth convolutional sub-network 220 and generate a network output 232 for the network input 202.

Figure 3:
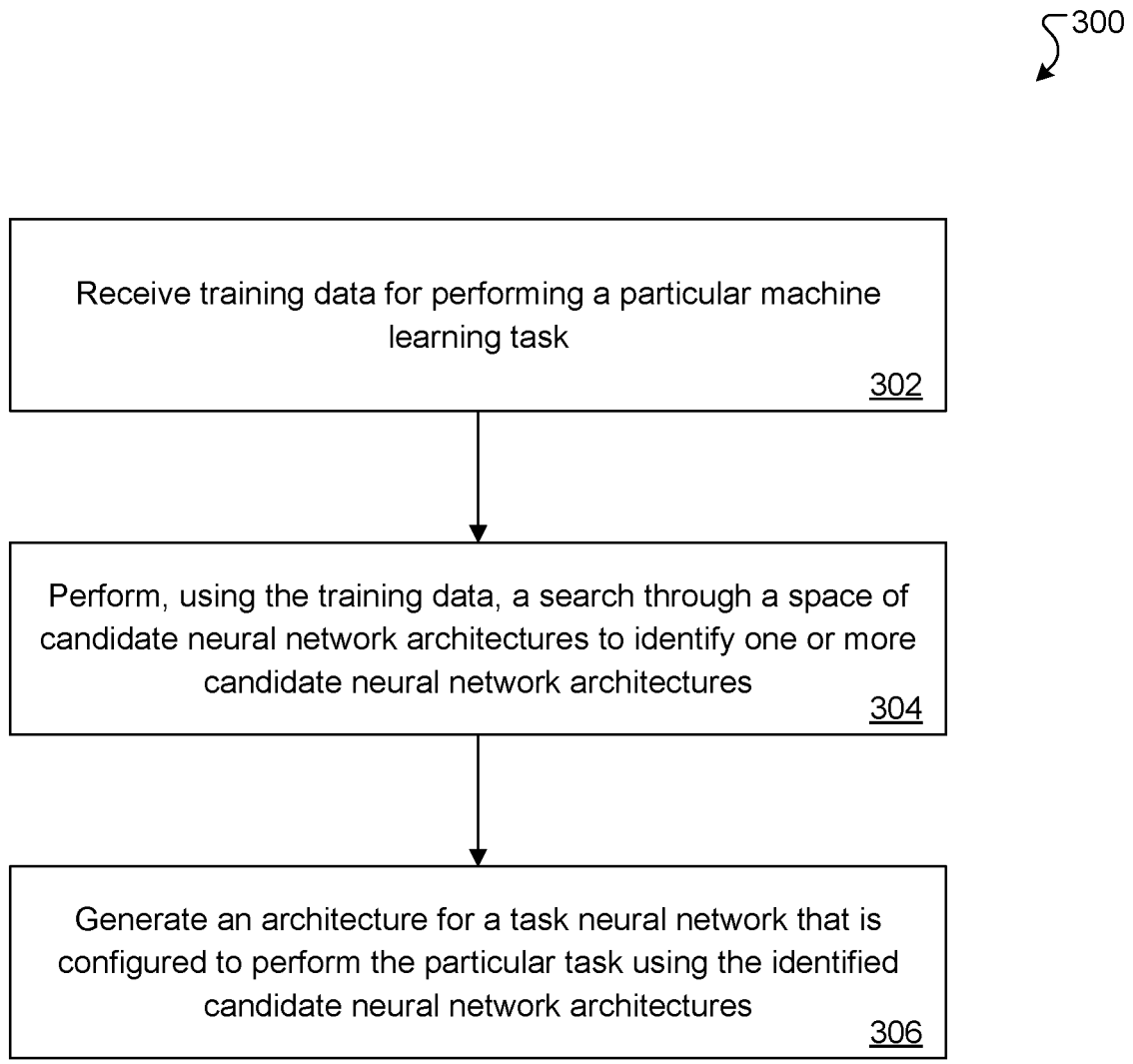
FIG. 3 is a flow diagram of an example process for determining an architecture for a task neural network that is configured to perform a particular machine learning task when deployed on a target set of hardware resources.

FIG. 3 is a flow diagram of an example process 300 for determining an architecture for a task neural network that is configured to perform a particular machine learning task when deployed on a target set of hardware resources. For convenience, the process 300 will be described as being performed by a system of one or more computers located in one or more locations. For example, a neural architecture search system, e.g., the neural architecture search system 100 of FIG. 1, appropriately programmed in accordance with this specification, can perform the process 300.

The system receives training data for performing a particular machine learning task (step 302). For example, this may correspond to the system 100, as described above with reference to FIG. 1, receiving training data 102 and/or validation set 104. In some examples, the particular machine learning task may correspond to an image processing task.

The system performs, using the training data, a search through a space of candidate neural network architectures to identify one or more candidate neural network architectures (step 304). For example, this may correspond to the controller 110 of the system 100, as described above with reference to FIG. 1, performing a search through the candidate architecture search space 111. As mentioned above, to select candidate neural network architectures and/or generate output specifying such candidate neural network architectures, the controller 110 may use any of a variety of different NAS techniques, such as NAS techniques based on reinforcement learning, evolutionary search, differentiable search, and the like. In some implementations, to perform the operations of step 304, the system repeatedly performs process 400, as described in further detail below with reference to FIG. 4.

FIG. 4 is a flow diagram of an example process 400 representative of an iteration of a process for performing a search through a space of candidate neural network architectures to identify one or more candidate neural network architectures. For convenience, the process 400 will be described as being performed by a system of one or more computers located in one or more locations. For example, a neural architecture search system, e.g., the neural architecture search system 100 of FIG. 1, appropriately programmed in accordance with this specification, can perform the process 400. As mentioned above, in some implementations, the system repeatedly performs the process 400 as part of step 304 of process 300.

The system selects a candidate neural network architecture from a space of candidate neural network architectures (step 402). For example, this may correspond to the controller 110 of the system 100, as described above with reference to FIG. 1, selecting a candidate neural network architecture from the candidate architecture search space 111. More specifically, at step 402, the system selects, for each of one or more components of the candidate neural network architecture, an operation to be performed by the component from a set of operations including a space-to-depth convolution operation. The space-to-depth convolution operation that is included in the set of operations may be an operation that increases a depth of an input tensor while decreasing a spatial extent of the input tensor. In addition, the set of operations may further include one or more other types of convolution operations. For example, the set of operations may correspond to operations reflected in the candidate architecture search space 111, as described above with reference to FIG. 1, which may include operations that are specific to the target set of hardware resources on which the candidate neural network architectures are intended to run or otherwise serve to take advantage of certain attributes of the target set of hardware resources. In some examples, the space-to-depth convolution operation may represent an example of one such operation. In some implementations, the space-to-depth convolution operation may be a stride-n n×n convolution, where n is an integer value that is greater than one. For example, in some such implementations, the space-to-depth convolution operation may be a stride-2 2×2 convolution. As mentioned above, this operation may be advantageously deployed on hardware accelerators for modifying a shape of an input tensor. In some implementations, the set of operations may further include one or more reshape operations that each modify a shape of an input tensor by performing one or more memory operations in one or memories of the target set of hardware resources. For instance, such one or more memory operations (e.g., space-to-batch operations) can include one or more operations that each reshape an input tensor by moving elements of the input tensor to different memory locations in one or memories of the target set of hardware resources, copying elements from one memory location to another, or both. As a particular example, these one or more operations can include one or more operations that rearrange blocks of spatial data into depth. More specifically, each of these one or more operations may output a copy of the input tensor where values from the height and width dimensions are moved to the depth dimension.

In some examples, the system selects the candidate neural network architecture from the space of candidate neural network architectures (step 402) based at least in part a measure of performance determined for one or more previously-selected candidate neural network architectures. For example, this may correspond to the controller 110, as described above with reference to FIG. 1, selecting a $k^{th}$ candidate neural network architecture from the candidate architecture search space 111 based at least in part on the multi-objective performance metric 142 determined for the $(k-1)'$ candidate neural network architecture selected by the controller 110, the multi-objective performance metric 142 determined for the $(k-2)^{th}$ candidate neural network architecture selected by the controller 110, and so on.

The system determines a measure of performance of the selected candidate neural network architecture based on its (i) performance on the particular machine learning task and (ii) performance when deployed on a target set of hardware resources (step 404). For example, this may correspond to the performance measurement engine 140, as described above with reference to FIG. 1, determining a multi-objective metric 142 for the candidate neural network architecture selected by the controller 110.

Furthermore, in some examples, the (i) performance of the selected candidate neural network on the particular machine learning task may correspond to the performance of the selected candidate neural network architecture that is reflected in the first performance metric 122 determined by the training engine 120 for the selected candidate neural network architecture. As such, in some implementations, the process 400 includes one or more additional steps in which the system trains the candidate neural network using training data. For example, this may correspond to the training engine 120, as described above with reference to FIG. 1, using training data 102 and/or validation set 104 to train an instance of the selected candidate neural network architecture. In some examples, such one or more additional steps may be performed after step 402, but before step 404.

Similarly, in some examples, the (ii) performance of the selected candidate neural network when deployed on a target set of hardware resources may correspond to the performance of the selected candidate neural network architecture that is reflected in the second performance metric 132 determined by the target hardware deployment engine 130 for the selected candidate neural network architecture. As such, in some implementations, the process 400 includes one or more additional steps in which the system runs a trained instance the candidate neural network on the target set of hardware resources. For example, this may correspond to the target hardware deployment engine 130, as described above with reference to FIG. 1, running a trained instance the candidate neural network on the target set of hardware resources that is associated with system 100. In some implementations, the target set of hardware resources may correspond one or more TPUs, GPUs, other matrix machines or vector machines, or a combination thereof.

In some implementations, the (ii) performance of the selected candidate neural network architecture when deployed on the target set of hardware resources is based at least in part on a latency of generating an output using the selected candidate neural network architecture when deployed on the target set of hardware resources. For example, such latency may correspond to a latency of the selected candidate neural network architecture that is measured by the target hardware deployment engine 130 when the target hardware deployment engine 130 runs the selected candidate neural network architecture on the target set of hardware resources, and that is reflected in the second performance metric 132 determined by the target hardware deployment engine 130 for the selected candidate neural network architecture.

In some implementations, the (ii) performance of the selected candidate neural network architecture when deployed on the target set of hardware resources is based at least in part on an operational intensity of the selected candidate neural network architecture when deployed on the target set of hardware resources. For example, such operational intensity may correspond to an operational intensity of the selected candidate neural network architecture that is measured by the target hardware deployment engine 130 when the target hardware deployment engine 130 runs the selected candidate neural network architecture on the target set of hardware resources, and that is reflected in the second performance metric 132 determined by the target hardware deployment engine 130 for the selected candidate neural network architecture. In some examples, such operational intensity corresponds to the "I" parameter, as described above with reference to FIG. 1.

In some implementations, the (ii) performance of the selected candidate neural network architecture when deployed on the target set of hardware resources is based at least in part on an execution efficiency of the selected candidate neural network architecture when deployed on the target set of hardware resources. For example, such execution efficiency may correspond to an execution efficiency of the selected candidate neural network architecture that is measured by the target hardware deployment engine 130 when the target hardware deployment engine 130 runs the selected candidate neural network architecture on the target set of hardware resources, and that is reflected in the second performance metric 132 determined by the target hardware deployment engine 130 for the selected candidate neural network architecture. In some examples, such execution efficiency corresponds to the "E" parameter, as described above with reference to FIG. 1.

Referring once again to FIG. 3, at step 306, the system generates an architecture for a task neural network that is configured to perform the particular task using the identified candidate neural network architectures. For example, this may correspond to the system 100, as described above with reference to FIG. 1, generating data 150 for output. In some examples, this may correspond to the system 100 or another system in communication with system 100 scaling up the size of the final architecture selected using a model scaling technique to generate the architecture for the task neural network.

In some implementations, the process 300 includes one or more additional steps in which the system performs the particular machine learning task on new inputs using the task neural network having the generated architecture. For example, this may correspond to one or more systems using the neural network reflected in data 150, as described above with reference to FIG. 1, or a neural network having an architecture that is similar or equivalent to the neural network architecture 200, as described above with reference to FIG. 2, to perform a particular machine learning task. For example, such a task may correspond to an image processing task.

In some implementations, the process 300 includes one or more additional steps in which the system provides data specifying the generated architecture for use in performing the particular machine learning task. For example, this may correspond to the system 100, as described above with reference to FIG. 1, providing data 150 for output.

Figure 5:
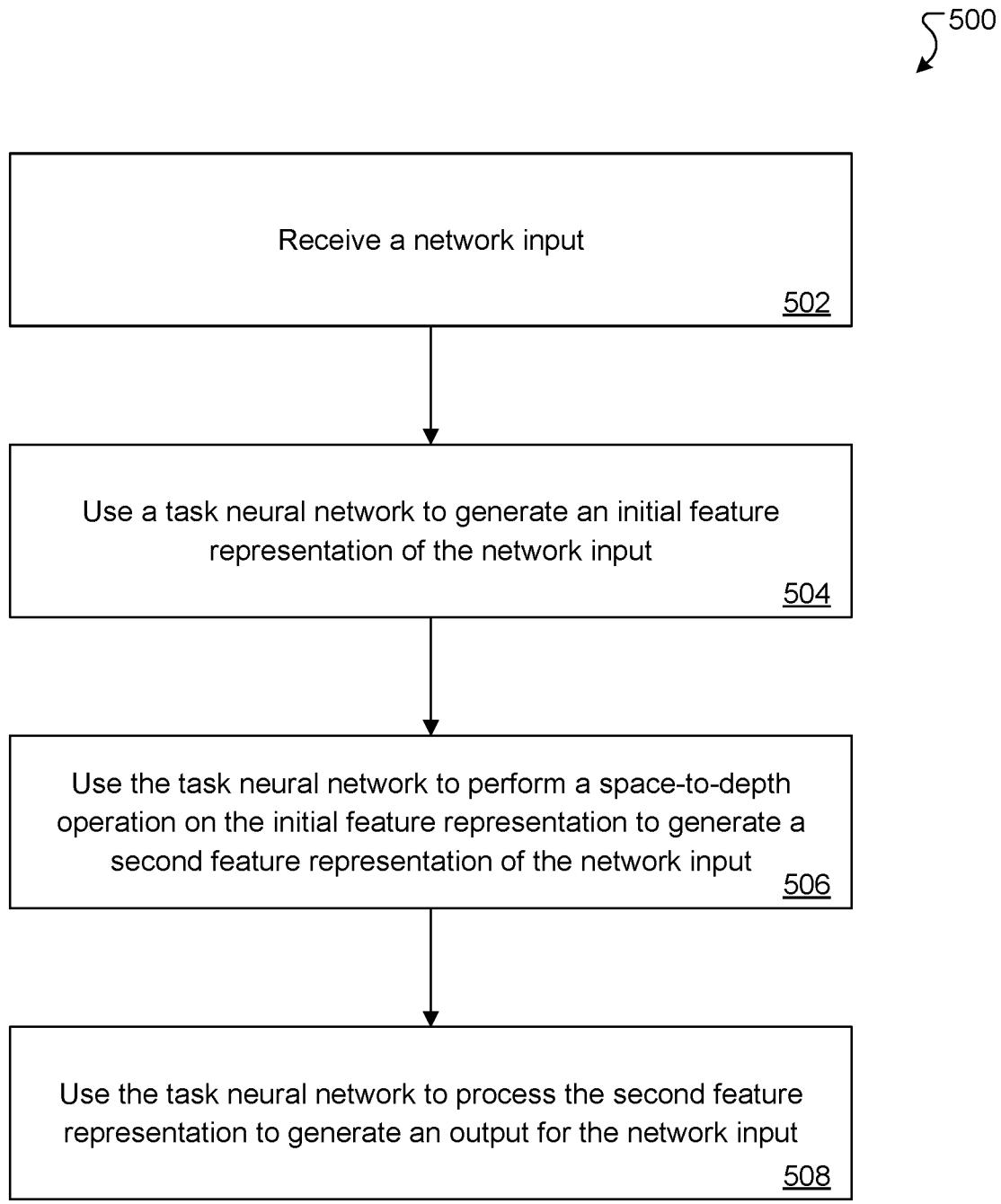
FIG. 5 is a flow diagram of an example process for using a task neural network to generate an output for a network input for a particular machine learning task.

FIG. 5 is a flow diagram of an example process 500 for using a task neural network to generate an output for a network input for a particular machine learning task. For convenience, the process 500 will be described as being performed by a system of one or more computers located in one or more locations. For convenience, the process 500 will be described as being performed by a system of one or more computers located in one or more locations. For example, a system on which a neural network having an architecture that is similar or equivalent to the neural network architecture 150 of FIG. 1 and/or the neural network architecture 200 of FIG. 2 is deployed, appropriately programmed in accordance with this specification, can perform the process 500.

The system receives a network input (step 502). For example, this may correspond to a system receiving network input 202, as described above with reference to FIG. 2. The system processes the network input using a task neural network to generate an output for the network input for a particular machine learning task (steps 504-508). For example, this may correspond to a system using a task neural network having an architecture similar or equivalent to the neural network architecture 200, as described above with reference to FIG. 2, to generate network output 232 for network input 202.

More specifically, at step 504, the system uses the task neural network to generate an initial feature representation of the network input. For example, this may correspond to the initial convolutional sub-network 210, as described above with reference to FIG. 2, being used to generate the initial feature representation 212 of the network input 202.

At step 506, the system uses the task neural network to perform a space-to-depth operation on the initial feature representation to generate a second feature representation of the network input. For example, this may correspond to the space-to-depth convolutional sub-network 220, as described above with reference to FIG. 2, being used to generate the second feature representation 222 of the network input 202 based on the initial feature representation 212. In some implementations, the space-to-depth convolution operation may be a stride-n n×n convolution, where n is an integer value that is greater than one. For example, in some such implementations, the space-to-depth convolution operation may be a stride-2 2×2 convolution. As mentioned above, this operation may be advantageously deployed on hardware accelerators for modifying a shape of an input tensor.

Then, at step 508, the system uses the task neural network to process the second feature representation to generate the output for the network input. For example, this may correspond to the one or more additional sub-networks 230, as described above with reference to FIG. 2, being used to generate network output 232 based on the second feature representation 222.

In some examples, the one or more additional sub-networks may include one or more convolutional layers. In some implementations, processing the network input using the task neural network includes using a set of one or more hardware accelerators to process the network input using the task neural network. In at least some of these implementations, the set of one or more hardware may include one or more tensor processing units (TPUs), one or more graphics processing units (GPUs), or a combination thereof.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of determining an architecture for a task neural network that is configured to perform a particular machine learning task when deployed on a target set of hardware resources comprising a plurality of hardware accelerators for performing the particular machine learning task, wherein the method comprises:
receiving training data for performing the particular machine learning task;
performing, using the training data, a search through a space of candidate neural network architectures to identify one or more candidate neural network architectures, wherein performing the search comprises repeatedly performing the following:
selecting a candidate neural network architecture from the space, wherein selecting the candidate neural network architecture comprises selecting, for each of one or more components of the candidate neural network architecture, an operation to be performed by the component from a set of operations in the space comprising (1) a space-to-depth convolution operation that increases a depth C of an input tensor of dimensionality H×W×C while decreasing a spatial extent H×W of the input tensor and (2) one or more other types of convolution operations, wherein the space-to-depth convolution operation increases the depth C to a second number of depth channels of the input tensor that is larger than a first number of depth channels of the input tensor, and wherein the space-to-depth convolution operation improves parallelism for the plurality of hardware accelerators; and
determining a measure of performance of the selected candidate neural network architecture comprising:
training a neural network having the selected candidate neural network architecture on the training data;
determining a first performance metric indicative of a level of accuracy based on a performance of the trained neural network having the selected candidate neural network architecture on the particular machine learning task;
determining a second performance metric indicative of a level of latency based on a performance of the trained neural network having the selected candidate neural network architecture when deployed on the target set of hardware resources, wherein the level of latency is based on an actual latency and a target latency, wherein the actual latency is the measured latency of performing the particular machine learning task by the trained neural network when deployed on the plurality of hardware accelerators, and the target latency is an ideal latency of performing the particular machine learning task by the trained neural network when deployed on the plurality of hardware accelerators; and
determining the measure of performance of the selected candidate neural network architecture based on a combined metric of the first performance metric indicative of the level of accuracy and the second performance metric indicative of the level of latency; and
generating a final architecture for the task neural network using the identified candidate neural network architectures, wherein the final architecture comprises one or more components that perform the space-to-depth convolution operation; and
executing the task neural network having the final architecture on the plurality of hardware accelerators to perform the particular machine learning task.

2. The method of claim 1, further comprising:
performing the particular machine learning task on new inputs using the task neural network having the generated final architecture.

3. The method of claim 1, further comprising:
providing data specifying the generated final architecture for use in performing the particular machine learning task.

4. The method of claim 1, wherein the space-to-depth convolution is a stride-n n×n convolution, where n is an integer value that is greater than one.

5. The method of claim 1, wherein the operations further comprise one or more reshape operations that each modify a shape of the input tensor by performing one or more memory operations in one or memories of the target set of hardware resources.

6. The method of claim 1, wherein a performance of the selected candidate neural network architecture when deployed on the target set of hardware resources is based at least in part on a latency of generating an output using the selected candidate neural network architecture when deployed on the target set of hardware resources.

7. The method of claim 1, wherein the measure of performance of the selected candidate neural network architecture when deployed on the target set of hardware resources is based at least in part on an operational intensity of the selected candidate neural network architecture when deployed on the target set of hardware resources.

8. The method of claim 1, wherein the measure of performance of the selected candidate neural network architecture when deployed on the target set of hardware resources is based at least in part on an execution efficiency of the selected candidate neural network architecture when deployed on the target set of hardware resources.

9. The method of claim 1, wherein the plurality of hardware accelerators is in a data center.

10. The method of claim 9, wherein the plurality of hardware accelerators comprises one or more tensor processing units (TPUs), one or more graphics processing units (GPUs), or a combination thereof.

11. The method of claim 1, further comprising:
after selecting the candidate neural network architecture from the space, using the training data to train an instance of the selected candidate neural network architecture, wherein determining the measure of performance of the selected candidate neural network architecture comprises:
determining a measure of performance of the trained instance of the selected candidate neural network architecture.

12. The method of claim 11, further comprising:
running the trained instance of the selected candidate neural network architecture on the target set of hardware resources, wherein the performance of the selected candidate neural network architecture when deployed on the target set of hardware resources comprises a performance of the trained instance of the selected candidate neural network architecture on the target set of hardware resources when run on the target set of hardware resources.

13. The method of claim 1, wherein selecting the candidate neural network architecture from the space comprises:
selecting a candidate neural network architecture from the space based at least in part on one or more measures of performance of one or more previously-selected candidate neural network architectures, respectively.

14. One or more non-transitory storage media storing instructions that when executed by one or more computers cause the one or more computers to perform operations for determining an architecture for a task neural network that is configured to perform a particular machine learning task when deployed on a target set of hardware resources comprising a plurality of hardware resources for performing the particular machine learning task, wherein the operations comprise:

receiving training data for performing the particular machine learning task;
performing, using the training data, a search through a space of candidate neural network architectures to identify one or more candidate neural network architectures, wherein performing the search comprises repeatedly performing the following:
selecting a candidate neural network architecture from the space, wherein selecting the candidate neural network architecture comprises selecting, for each of one or more components of the candidate neural network architecture, an operation to be performed by the component from a set of operations in the space comprising (1) a space-to-depth convolution operation that increases a depth C of an input tensor of dimensionality H×W×C while decreasing a spatial extent H×W of the input tensor and (2) one or more other types of convolution operations, wherein the space-to-depth convolution operation increases the depth C to a second number of depth channels of the input tensor that is larger than a first number of depth channels of the input tensor, and wherein the space-to-depth convolution operation improves parallelism for the plurality of hardware accelerators; and
determining a measure of performance of the selected candidate neural network architecture comprising:
training a neural network having the selected candidate neural network architecture on the training data;
determining a first performance metric indicative of a level of accuracy based on a performance of the trained neural network having the selected candidate neural network architecture on the particular machine learning task;
determining a second performance metric indicative of a level of latency based on a performance of the trained neural network having the selected candidate neural network architecture when deployed on the target set of hardware resources, wherein the level of latency is based on an actual latency and a target latency, wherein the actual latency is the measured latency of performing the particular machine learning task by the trained neural network when deployed on the plurality of hardware accelerators, and the target latency is an ideal latency of performing the particular machine learning task by the trained neural network when deployed on the plurality of hardware accelerators; and
determining the measure of performance of the selected candidate neural network architecture based on a combined metric of the first performance metric indicative of the level of accuracy and the second performance metric indicative of the level of latency; and
generating a final architecture for the task neural network using the identified candidate neural network architectures, wherein the final architecture comprises one or more components that perform the space-to-depth convolution operation; and
executing the task neural network having the final architecture on the plurality of hardware accelerators to perform the particular machine learning task.

15. The one or more non-transitory storage media of claim 14, further comprising:

performing the particular machine learning task on new inputs using the task neural network having the generated final architecture.

16. The one or more non-transitory storage media of claim 14, further comprising:
providing data specifying the generated final architecture for use in performing the particular machine learning task.

17. The one or more non-transitory storage media of claim 14, wherein the space-to-depth convolution is a stride-n n×n convolution, where n is an integer value that is greater than one.

18. The one or more non-transitory storage media of claim 14, wherein the operations further comprise one or more reshape operations that each modify a shape of the input tensor by performing one or more memory operations in one or memories of the target set of hardware resources.

19. The one or more non-transitory storage media of claim 14, wherein the measure of performance of the selected candidate neural network architecture when deployed on the target set of hardware resources is based at least in part on a latency of generating an output using the selected candidate neural network architecture when deployed on the target set of hardware resources.

20. The one or more non-transitory storage media of claim 14, wherein the plurality of hardware accelerators is in a data center.

* * * * *